United States Patent [19]
Briscoe

[11] Patent Number: 4,718,788
[45] Date of Patent: Jan. 12, 1988

[54] WIRE ROPE EQUALIZER SOCKET

[75] Inventor: Terry L. Briscoe, Portland, Oreg.

[73] Assignee: ESCO Corporation, Portland, Oreg.

[21] Appl. No.: 893,246

[22] Filed: Aug. 5, 1986

[51] Int. Cl.$^4$ .............................................. F16G 11/00
[52] U.S. Cl. .................................. 403/211; 24/115 M; 24/136 R; 74/501 R
[58] Field of Search ........................... 74/502.6, 500.5; 403/211, 210, 209; 294/102.1, 74; 24/136 K, 136 L, 136 R, 115 M, 115 R

[56] References Cited

U.S. PATENT DOCUMENTS

| | | | |
|---|---|---|---|
| 1,369,842 | 3/1921 | Schaffernocker | 24/115 M |
| 1,380,800 | 6/1921 | Haworth | 403/211 |
| 1,611,296 | 12/1926 | West | 403/211 |
| 1,850,896 | 3/1932 | Roe . | |
| 2,085,333 | 6/1937 | Reynolds | 403/211 |
| 2,130,040 | 9/1938 | Siler | 403/211 X |
| 2,443,155 | 6/1948 | Zahutnik | 403/211 |
| 2,838,819 | 6/1958 | Falkenstein . | |
| 2,977,654 | 4/1961 | Page | 403/211 |
| 3,214,812 | 11/1965 | Beneduce . | |
| 3,335,470 | 8/1967 | Baer | 403/211 |
| 3,811,155 | 5/1974 | Stafford | 24/136 R |
| 4,561,154 | 12/1985 | Briscoe . | |
| 4,572,565 | 2/1986 | Epstein | 24/115 M |
| 4,602,891 | 7/1986 | McBride | 403/211 |

FOREIGN PATENT DOCUMENTS

| | | | |
|---|---|---|---|
| 1051573 | 2/1959 | Fed. Rep. of Germany | 24/136 R |
| 694725 | 9/1930 | France | 403/211 |
| 775474 | 7/1934 | France | 403/211 |
| 660357 | 2/1964 | Italy | 24/136 L |
| 107636 | 7/1917 | United Kingdom | 24/136 K |
| 665699 | 1/1952 | United Kingdom | 403/211 |

Primary Examiner—Gary L. Smith
Assistant Examiner—Rodney M. Lindsey
Attorney, Agent, or Firm—Tilton, Fallon, Lungmus & Chestnut

[57] ABSTRACT

An equalizer socket including a socket body, a plurality of grooved wire receiving wedges removably inserted therein and at least one center wedge having a greater taper in bearing contact with the ropes of the grooved wedges, and constraining means associated with the end of the socket body for the center wedge.

9 Claims, 9 Drawing Figures

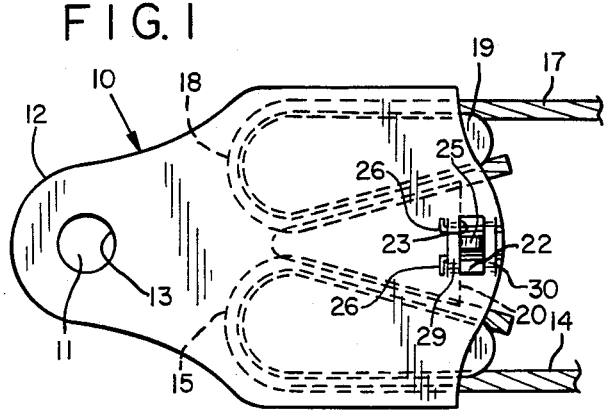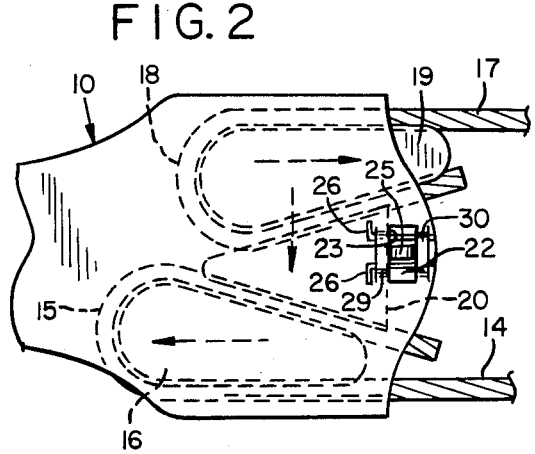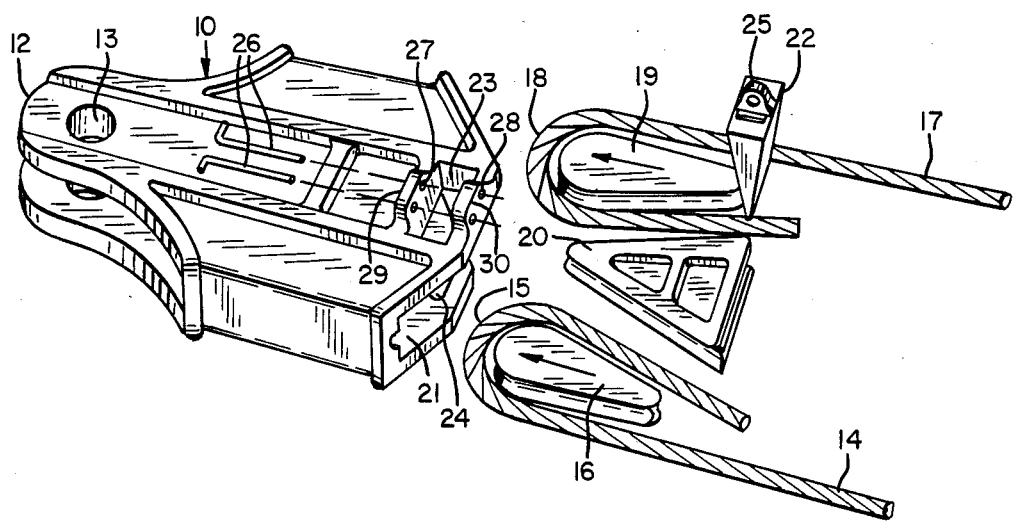

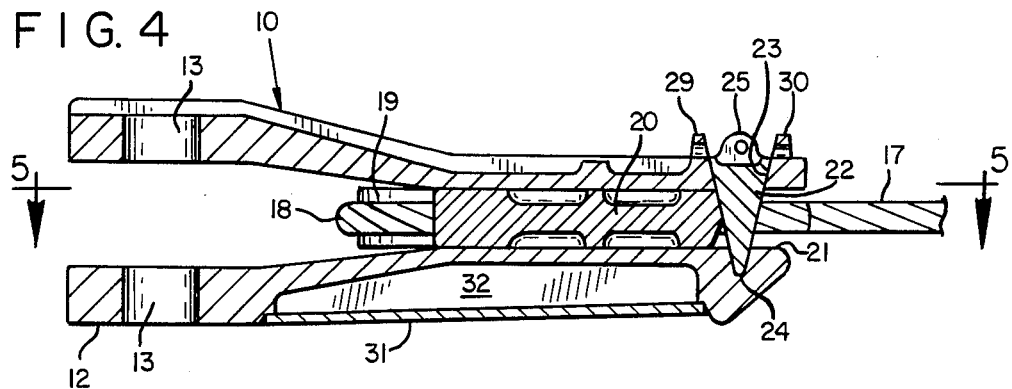
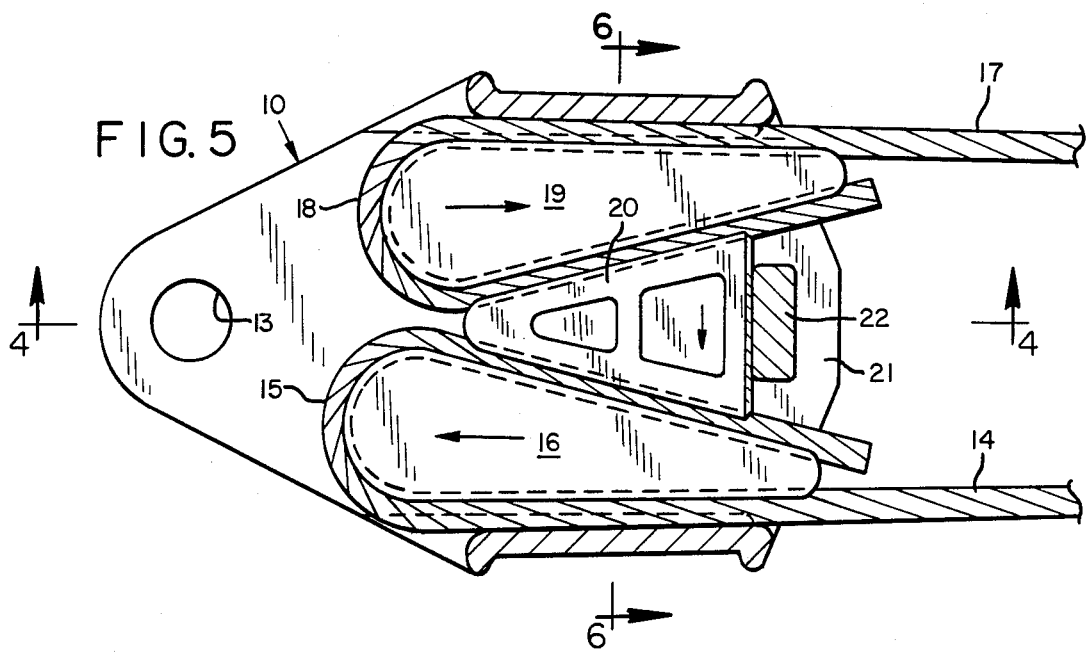
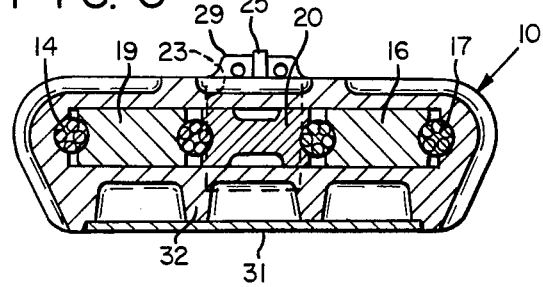
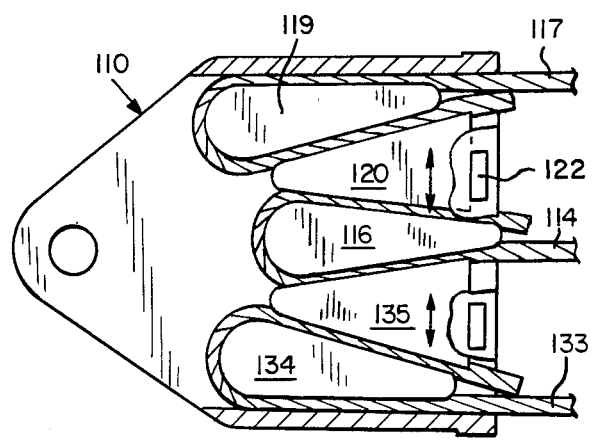

WIRE ROPE EQUALIZER SOCKET

BACKGROUND AND SUMMARY OF INVENTION

This invention relates to a wire rope equalizer socket and, more particularly, a socket which allows for two ropes to be equalized within a single socket.

The present system where twin rope hoisting or dragging mechanism is utilized, requires two separate sockets with an equalizer and another link to perform the same function that the inventive socket provides.

Although twin rope sockets are known—see U.S. Pat. Nos. 1,850,896; 2,838,819; and 3,214,812; none of them have provided an equalizing function.

The invention allows for equalization of length and tension without the use of a standard equalizer. The system includes a large socket or housing which contains two standard wedges and one double tapered wedge, all of which are movable. This allows for attachment of two separate ropes in a single socket.

When ropes of slightly different lengths are inserted into the socket, and tension is applied, the shorter rope carries a higher proportion of the load. Because of this higher load, the wedge and rope move forward, causing lateral displacement of the double tapered wedge. The wedge from the other rope is forced outward until the two lengths of rope are pulling with equal tension.

Other objects and advantages of the invention may be seen in the details of the ensuing description.

The invention is described in conjunction with the accompanying dawing, in which FIG. 1 is an elevational view of the inventive rope-equipped socket;

FIG. 2 is a view similar to FIG. 1 but showing the operable portions thereof in different condition:

FIG. 3 is a fragmentary perspective view of the invention in disassembled condition;

FIG. 4 is a longitudinal sectional view such as would be seen along the sight line 4—4 of FIG. 5;

FIG. 5 is another longitudinal sectional view such as would be seen along the sight line 5—5 of FIG. 4;

FIG. 6 is a transverse sectional view such as would be seen along the sight line 6—6 of FIG. 5;

FIG. 7 is a sectional view similar to that of FIG. 5 but of a modification of the invention;

DETAILED DESCRIPTION

Figure 8:
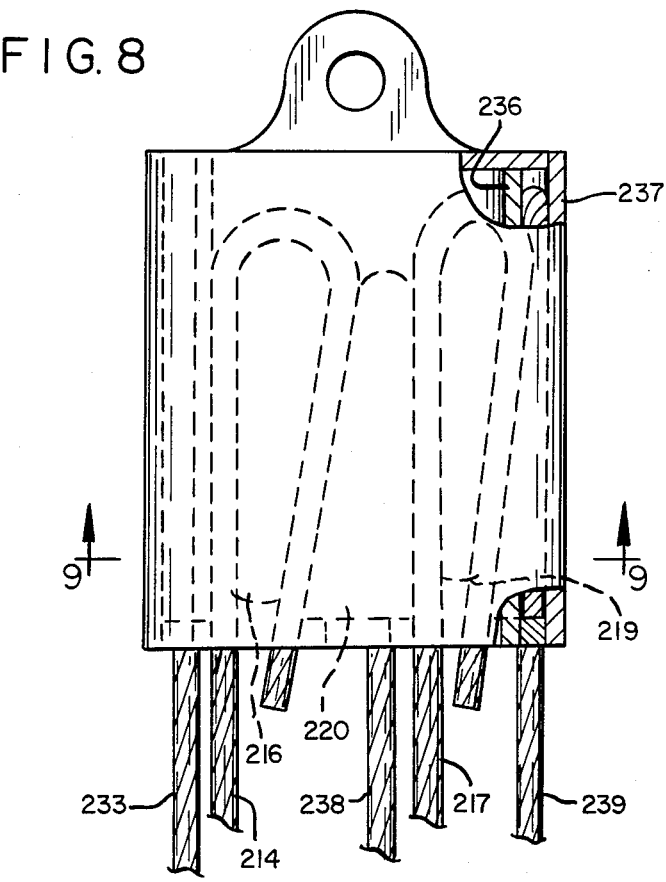
FIG. 8 is a view similar to FIG. 1 but of yet another modification to the invention.

In the drawing, the numeral 10 designates generally a housing which is advantageously constructed of steel and which has at its upper end means 11 for connection to a chain or the like—as where the inventive socket is used in conjunction with a dragline bucket. The means 11 may advantageously take the form of a clevis 12 (see FIG. 4) having aligned openings 13.

The remainder of the housing is devoted to receiving and maintaining the operative wedges and ropes. In the illustration given, the left hand rope 14 is seen to be looped at 15 about a grooved wedge 16. The right hand rope 17 is looped as at 18 about a second grooved wedge 19.

A third double tapered wedge 20 is positioned in bearing relation between the two looped ropes 15 and 18 and is maintained against outward movement through the end opening 21 by means of a removable key 22. The key or lock 22 extends through an opening or slot 23 in the housing 10 and into a pocket 24 (see FIG. 4) so as to restrain outward movement of the wedge 20 but which permits lateral movement thereof.

The invention is advantageous in utilizing fewer pieces and less weight than current systems.

The invention eliminates one socket and one pin in addition to the equalizer and the connecting link. In other words, the previous assembly utilized two sockets, two pins, for those two sockets, one equalizer and one connecting link with a pin in each end. Therefore, there were four parts and four pins which are now replaced by one part and pin.

The invention also provides easier disassembly than the present system. Large wire rope sockets are often difficult to disassemble due to the wedging necessary to prevent slippage. With the new system, the restraint for the center double tapered wedge will allow much easier and quicker disassembly. This advantage is significant when it is considered the size and weights involved. A representative socket for a dragline bucket weighs upward of 3,000 pounds with each of the rope wedges weighing more than 200 pounds and being over 3 feet long.

The inventive socket also provides a higher effective dump height for the associated hoisting equipment. Since pieces are eliminated from the linkage, the dragline of the clamshell bucket, for example, can be lifted higher. In an actual test, one of the ropes was preshortened by 6" which then began to pull the entire assembly. Then, as illustrated in FIG. 2, the wedge 19 associated with the shorter rope 17 moved forward which moved the third wedge 20 laterally until the two single wedges were offset approximately twist sideways because of the different tension in the ropes but always pulled perfectly straight.

The taper on the third wedge 20 is greater than the taper on the looped wedges 16 and 19. A taper of the order of about 15° was chosen for each of the looped wedges 16 and 19 because this is a definite wedging taper. From a consideration of FIG. 1, for example, it will be seen that the outboard edges of the two wedges 16 and 19 are parallel so the taper is provided by the inboard edges. A 15° taper is a definite wedging taper where wire rope is employed. Normally, wire rope experiences a wedging taper in the range of about 18°–20° but with sockets, this interior angle can develop some rope slippage. In the practice of the invention, the looped wedge has a definite wedging taper in combination with a center wedge that has a definite non-wedging taper. The center wedge 20 is roughly twice the taper of each looped wedge 16, 19. This allows substantial latitude. A 20° wedge in a drag socket is a wedging taper but is still removable with a great deal of force and therefore it is advantageous to increase that angle to a minimum of at least about 24° so as to make the removal of the center wedge 20 much easier. For example, testing with a 14° looped wedge and a 28° center wedge allowed for easy removal in practice, it is preferred to have a looped wedge with an angle that is a definite wedging taper of approximately 15° with the center wedge being definitely non-wedging taper or greater than about 24°.

This provides a socket which permits removal of all wedges and wire ropes without the need for burning any of the wire ropes. This is allowed for by the ability to remove the pin 22 which retains the center wedge and thereby allowing all three wedges and the wire ropes to be removed from the front opening 21 of the socket.

Pin Construction

As can be first appreciated from a consideration of FIG. 3, the pin 22 is itself a tapered element or wedge and is equipped with a lifting eye 25 projecting upwardly from the main body of the pin 22. The pin 22 is constrained within its mounting provided by the opening 23 and pocket 24 by means of Z-bars 26—see the left hand portion of FIG. 3. These are illustrated as L-shaped prior to insertion into aligned openings 27 and 28 provided on upstanding lugs 29 and 30 on the upper surface of the socket 10. After the Z-bars 26 are mounted in the openings 27 and 28 to constrain the pin 22, the outwardly extending end portions are bent to form a Z, hence the Z-bar designation. These can be burned out and, once removed, the pin 22 is readily lifted out of its lodging within the opening 23 and pocket 24. For this purpose, the angles between the bearing surfaces of the pin 22, opening 23 and pocket 24 are made with a non-wedging taper. In this respect, the sliding action developed is somewhat akin to that shown in co-owned patent of Briscoe et al U.S. Pat. No. 4,561,154—and reference may be had to that patent for explanation of the sliding movement of the lock parts.

Still referring to FIG. 4, it will be seen that a replaceable wear plate 31 is provided on the underside of the socket 10. This may be welded into place and serves to provide a replaceable wearing surface for the socket when used in action as for example on a dragline bucket. The wear plate 31 as can be appreciated from FIG. 6 is supported and reinforced by integral ribs 32 on the under side of the socket body 10.

The invention also provides an equalizer socket for three or more ropes. As can be noted in FIG. 7, a socket body 110 is provided for three ropes as at 117, 114, and 133, reading downward at the extreme right. Grooved wedges are provided at 119, 116 and 134 with non-wedging taper wedges provided at 120 and 135, having locking pins 122. It will be noted that as the number of center wedges 120, 135 increases, the included angle of the center wedge becomes closer to the included angle of the looped wedges and therefore easy removal by use of the retaining pin becomes somewhat more difficult.

Figure 9:
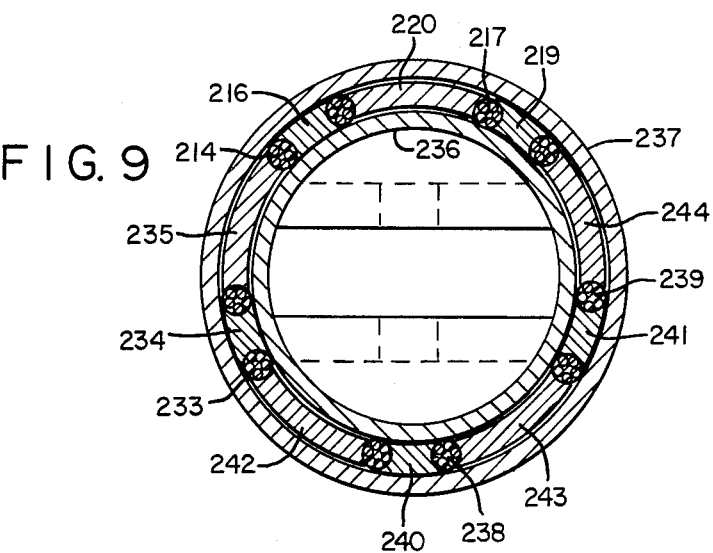
FIG. 9 is a sectional view taken along the sight line 9—9 as applied to FIG. 8.

Should it be desired to provide a larger number of ropes equalized to a single point or line, the arrangement of FIGS. 8 and 9 can be employed. This consists of two concentric pipes 236 and 237. The difference in diameters of the two pipes 236 and 237 is sufficient to accommodate the wire ropes and the wedges in a fashion so that there can be the relative sliding action previously referred to.

More particularly, five wire ropes are seen in FIG. 9 and designated 217, 214, 233, 238 and 239. The rope 217 is looped about wedge 219, the rope 214 around the wedge 216, the rope 233 around the wedge 234, the rope 238 around the wedge 240 and the rope 239 about the wedge 241. These wedges as well as the "center" wedges as at 220, 235, 242, 243 and 244 are all arcuate so as to conform to the annulus provided by the difference in diameters of the pipes 237 and 236.

It will be noted that the looped wedges and the center wedges would be virtually the same angle and the function of this equalizer is that all of the ropes and wedges would tighten upon themselves rather than tighten on the constraints of the outside of the equalizer socket. Thus, pins have been omitted from the showing in FIG. 8 although it is believed that these could be advantageous at least initially to provide a constraint during initial loading.

In any event, the invention provides an equalizer assembly whose center wedge does not carry the entire load of both ropes—as in the illustration of FIGS. 1-6—but only carries the load until the assembly seats and wedges together. According to testing, this was approximately 35% of the total load at the outset and it is expected that even this percentage would be reduced as more load is applied. This then provides for a retaining pin for the center wedge which need not be as strong as a pin for the entire system—and therefore it is more easily removed as well as being lighter and less expensive. This is a significant advantage because an equalizer socket that has the ability to be disassembled quickly and easily so as to change ropes, eliminates the need in the past for the use of such extreme expedients as a pendulum ram or cannon for wedge removal.

While in the foregoing specification, a detailed description of an embodiment of the invention has been set down for the purpose of illustration, many variations in the details hereingiven may be made by those skilled in the art without departing from the spirit and scope of the invention.

I claim:

1. A wire rope equalizer socket comprising a relatively elongatged housing having first and second ends, means adjacent said first end for connecting said housing to chain means, an opening extending inwardly of said housing from said second end for the receipt of a pair of looped wire ropes, first and second wedges positioned in said opening, each wedge having an outwardly-facing groove adapted to receive a loop of a wire rope, a first wire rope having a loop received in the groove of said first wedge and a second wire rope having a loop received in the groove of said second wedge, said first and second rope and said first and second wedges being disposed in side-by-side relation in said opening with said loops being coplanar and with said wedges being tapered toward said second end, a third grooved wedge in said opening in bearing relation to said first and second rope loops and being tapered toward said first end, and pin means removably mounted in said housing extending generally perpendicularly to the plane of said loops for maintaining said third wedge against longitudinal movement out of said opening but to permit lateral movement in said plane for equalizing the tension in said first and second ropes upon longitudinal outward movement of one of said loops in said opening.

2. The socket of claim 1 in which said third wedge has a greater taper than each of said first and second wedges.

3. The socket of claim 1 in which each of said first and second wedges has a wedging taper of about 15°, said third wedge having a non-wedging taper of at least about 24°.

4. The socket of claim 1 in which said pin means includes a wedge element slidably lodged in said socket and removable retaining means for maintaining said pin means in position in said socket.

5. A wire rope equalizer socket comprising a relatively elongated housing having first and second ends, means adjacent said first end for connecting said housing to chain means, an opening extending inwardly of said housing from said second end and first and second grooved wedges and first and second looped wire ropes received in said opening, each wire rope being looped about a separate one of said grooved wedges, said loops and wedges being disposed in side-by-side relation in said opening and with said wedges being equipped with a wedging taper toward said second end, a third grooved wedge in said opening in bearing relation to said first and second loops and being equipped with a non-wedging taper toward said first end, and pin means removably mounted in said housing.

6. The socket of claim 5 in which said pin means is a wedge element equipped with a non-wedging taper, said socket being equipped with an aligned slot and pocket having sides of a non-wedging taper, said pin means being removably mounted in said slot and pocket, and bar means releasably maintaining said pin means in said slot and pocket.

7. The socket of claim 6 in which said wedge element is equipped with a lifting eye.

8. A wire rope equalizer socket for a plurality of wire ropes comprising a relatively elongated housing having first and second ends, means adjacent said first end for connection to chain means, an opening extending inwardly of said housing from said second end and a plurality of looped wire ropes and an equal plurality of grooved wedges received in said opening, each wire rope being looped about a separate one of said grooved wedges, said loops and wedges being disposed in side-by-side relation in said opening and with said wedges being tapered toward said second end, grooved wedge means in said opening in bearing relation with each pair of adjacent loops and being tapered toward said first end.

9. The socket of claim 8 in which said housing includes concentric pipes defining an annular opening to accommodate at least three looped wire ropes.

* * * * *